No. 673,411. Patented May 7, 1901.
L. AXTELL.
DRIER.
(Application filed Aug. 21, 1900.)
(No Model.) 2 Sheets—Sheet 2.

WITNESSES:
Helen L. Oberteuffer
Israel Cohen

INVENTOR
Lucius Axtell
BY
W. P. Hutchinson,
ATTORNEY

THE NORRIS PETERS CO., PHOTO-LITHO., WASHINGTON, D. C.

UNITED STATES PATENT OFFICE.

LUCIUS AXTELL, OF TOMPKINS, NEW YORK, ASSIGNOR TO DAVID W. LEWIS, OF SAME PLACE.

DRIER.

SPECIFICATION forming part of Letters Patent No. 673,411, dated May 7, 1901.

Application filed August 21, 1900. Serial No. 27,534. (No model.)

*To all whom it may concern:*

Be it known that I, LUCIUS AXTELL, of the town of Tompkins, county of Delaware, and State of New York, have invented certain new and useful Improvements in Driers, of which the following is a full, clear, and exact description.

My invention relates to improvements in driers, and particularly to that class of driers which is adapted for use in treating casein curd or analogous substances.

My present invention is an improvement on that shown in Letters Patent of the United States No. 629,644, dated April 25, 1899. The apparatus shown in the patent referred to works well and is useful in many ways; but in some respects its work is not quite satisfactory. For instance, in the apparatus shown in the patent the heat is admitted directly to the cylinder containing the casein matter, the hot air being let directly into the cylinder at the end nearest the heater and passes through the matter contained in the cylinder and out at the opposite end. As a result the casein is dried more quickly at one end of the cylinder than at the other, and it is difficult to have the matter equally treated at all parts of the cylinder.

One object of my present invention is to obviate this difficulty by introducing and discharging the heated air in such a way that an approximately even temperature will be maintained in all parts of the cylinder, thus insuring a relatively perfect product.

Other objects of my invention are to produce an apparatus of this kind which is very simple and convenient and in which the heated air is exhausted from the same end of the cylinder in which it is admitted.

With these ends in view my invention consists of certain features of construction and combination of parts, which will be hereinafter described and claimed.

Reference is to be had to the accompanying drawings, forming part of this specification, in which similar figures of reference refer to similar parts throughout the several views.

Figure 1:
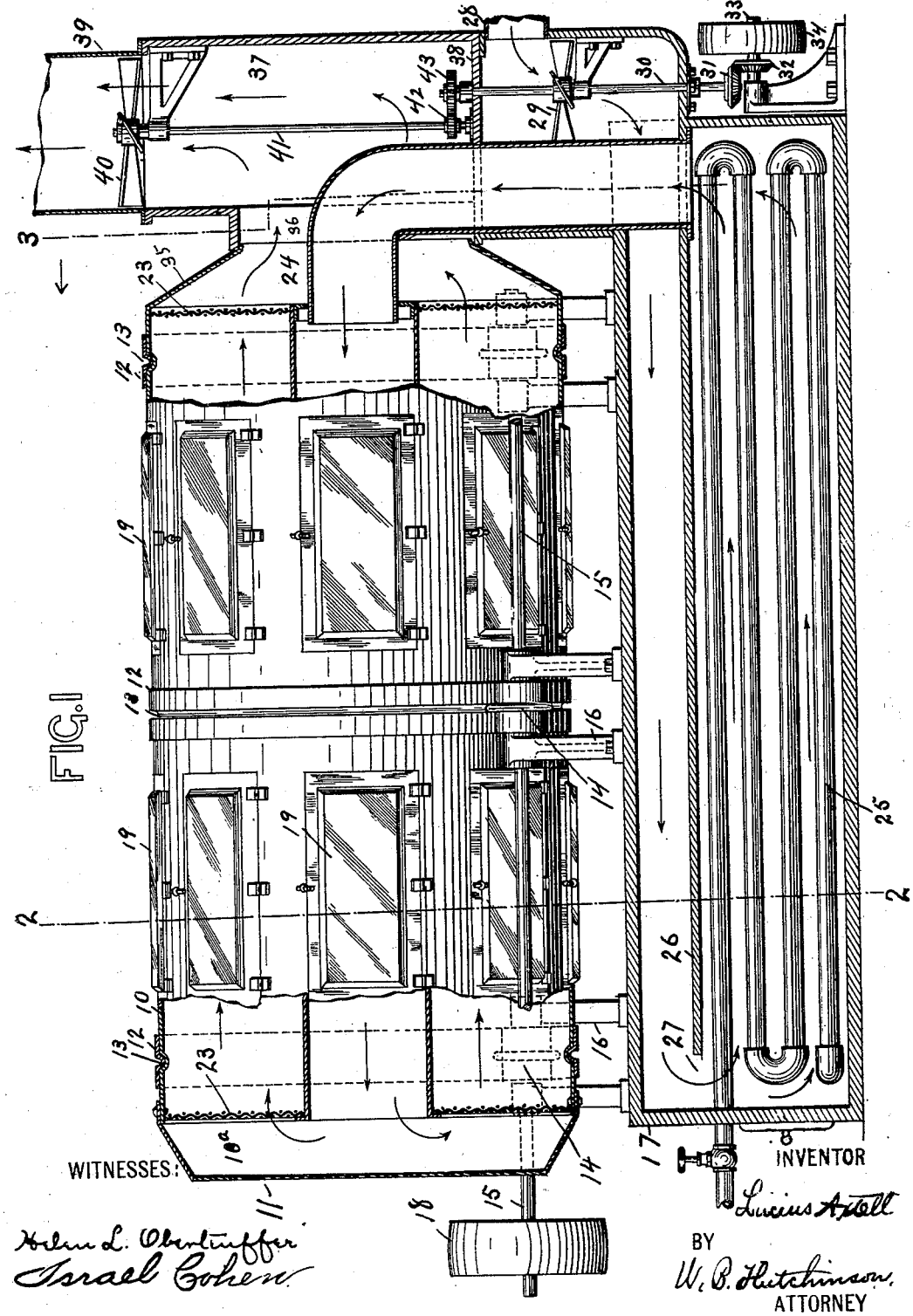
Figure 2:
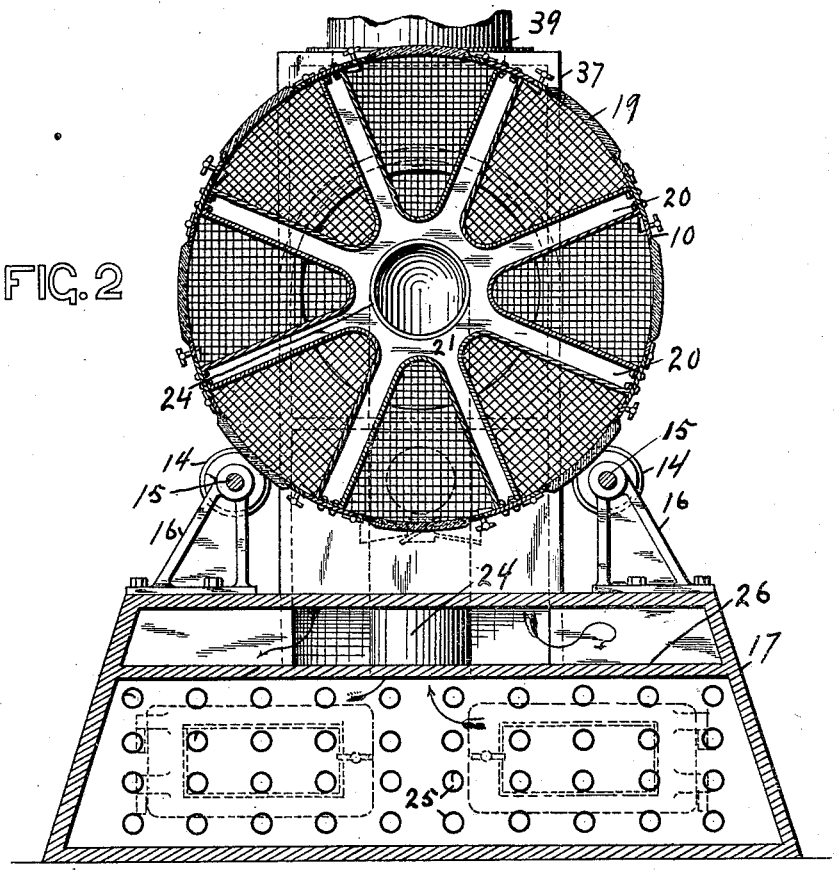
Figure 3:
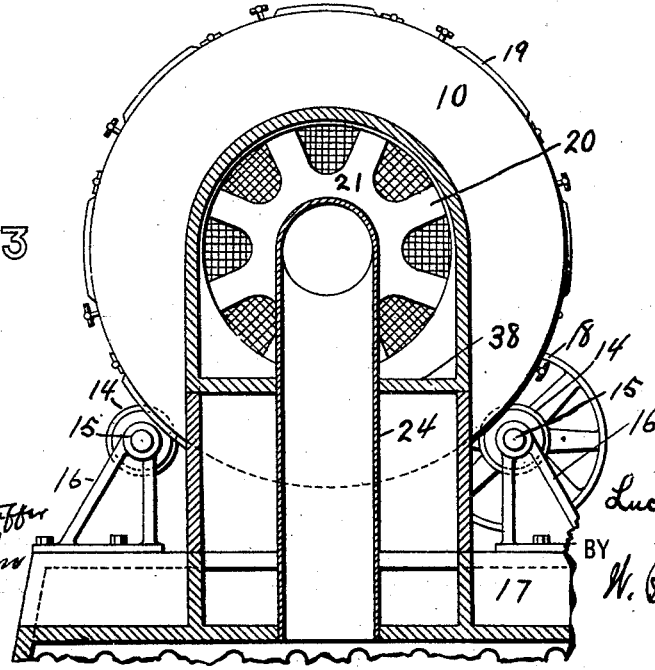

Figure 1 is a broken side elevation, partly in longitudinal section, of my improved apparatus. Fig. 2 is a cross-section on the line 2 2 of Fig. 1, and Fig. 3 is a cross-section on the line 3 3 of Fig. 1 looking in the direction of the arrow.

The cylinder 10 is in a general way like that described in the patent referred to and turns on a horizontal axis, the cylinder being closed at one end, as shown at 11, and preferably reinforced at necessary intervals, as shown at 12, and provided with circular grooved tracks 13, which receive and ride on the edges of the friction-wheels 14, these being secured to the shafts 15, which are arranged parallel with the cylinder 10 and beneath the cylinder and at opposite sides of its center. Each shaft 15 is journaled in suitable brackets 16, which are supported on a hollow base 17 of the apparatus, and one of the shafts 15 is provided with a pulley 18 or equivalent driving means, so that when the shaft is turned the wheels 14 will turn and a slow rotary movement be imparted to the cylinder 10. The cylinder is provided at frequent and necessary intervals with glass doors 19 to admit light to the cylinder, this great quantity of light being essential to produce a proper bleaching effect of the matter treated. All the above construction, with the exception of the drying means, is similar to that in the patent referred to.

Arranged longitudinally within the cylinder, extending its full length, is a hollow spider 21, which has radial hollow arms 20, extending to the wall of the cylinder, thus forming a series of pockets to contain the casein matter or curd, and by referring to Fig. 2 it will be noticed that the doors 19 are arranged so as to come opposite the several pockets. The ends of the cylinder are internally closed by the screens 23, which prevent the curd or casein matter from falling out at the ends of the pockets. In the drawings the spider 21 is shown as made of metal unperforated; but it will be understood that the metal may be perforated at desired points without affecting the principle of the invention.

The hot air passes longitudinally through the bore of the spider 21 and through the hollow arms 20 thereof, passing back through pockets between the arms, and the hot air is fed to the spider by a pipe 24, (see Fig. 1,) which leads from the hollow base 17 and into which the hot air rises from the steam-coil 25. Above the steam-coil and within the hollow base is a deflector or horizontal partition 26, which is open at the rear end, as shown at 27, and the air is forced rearward above this deflector and around the pipe 24 by a fan or blower 29, which draws in the air through the opening 28 and forces it forward, as shown by the arrows. The fan, as illustrated, is driven by a shaft 30, which is geared, as shown at 31 and 32, to a driving-shaft 33, which has a suitable pulley 34 thereon; but it will be clearly understood that this method of driving the fan and of taking in the air is immaterial, and the fan may be located differently, if desired, and the air may be forced forward in any convenient way without affecting the principle of the invention.

The cylinder 10 is reduced at its front end, as shown at 35, and the air within the cylinder is exhausted through the opening 36 of this reduced end, passing into the casing 37, which is divided at a point just below the mouth of the cylinder by a horizontal partition 38, which thus separates the incoming and outgoing air. The exhaust is discharged into the pipe 39, being assisted by the fan 40, which is located at the base of the pipe 39 and is driven by the shaft 41, which connects by gears 42 and 43 with the shaft 30, already referred to. Obviously, however, the fan 40 may be driven in any convenient way, and while it is desirable to have fans near the inlet and outlet of the apparatus—one forcing the air forward and the other exhausting— still the apparatus can be used with only one fan without affecting the principle of the invention.

When the apparatus is to be used, it is loaded with the matter to be treated, this matter being placed in the several pockets between the hollow arms 20 of the spider 21, and the cylinder is then slowly revolved, the matter therein being turned over and over and sliding from one wall of a pocket to the next. Meanwhile the air forced forward by the fan 29 passes around the pipes of the coil 25, up through the pipe 24, and through the spider 21 and the hollow arms thereof to the rear end of the cylinder, as shown in Fig. 1, sufficient space being left to form a chamber 10ª at this point, and from here the air passes back through the matter contained in the several pockets of the cylinder and finally out through the mouth 26, casing 37, and pipe 39. It will be noticed that the part of the spider nearest the pipe 24 will be hottest; but the air will be hottest where it enters the rear end of the cylinder, so that while the curd or other matter in the pockets of the cylinder will be most heated by contact with the metal at the front end of the cylinder the matter will be most heated by the air at the rear end of the cylinder. Thus an equalization of temperature and of drying effect is maintained.

I have shown and described the foregoing apparatus as adapted for use in treating casein curd; but I do not limit the invention to this purpose, as it can be used for treating many other things.

Having thus described my invention, what I claim as new, and desire to secure by Letters Patent, is—

1. A drier comprising a rotatable body, a hollow spider arranged longitudinally in the body and provided with radial hollow arms extending to the wall of the body and forming pockets between them, means for forcing air through the spider in one direction, and means for driving the air back through the pockets in the opposite direction.

2. An apparatus of the kind described, comprising a rotatable body having an exit at one end and a chamber at the other, a hollow spider arranged longitudinally in the body and provided with hollow arms extending to the body and forming pockets between them, and an inlet-pipe delivering into the spider.

3. A drier comprising a rotatable body having a chamber at one end and a mouth or exit at the other, a hollow spider arranged longitudinally in the body and provided with hollow arms extending to the walls of the body and forming pockets between them, an inlet-pipe delivering into the front end of the spider, and means for forcing air through the spider in one direction and discharging it through the pockets and out of the mouth of the body in the other direction, substantially as described.

4. An apparatus of the kind described, comprising a rotatable body having one end closed and the other provided with a discharge-mouth, a casing at the mouth of the body, said casing being provided with a discharge-pipe, an air-heating apparatus below the rotatable body, a hollow spider extending longitudinally through the body and provided with radial hollow arms forming pockets between them, a pipe leading from the air-heating apparatus to the front end of the spider, and means for forcing air from the heating apparatus through the said pipe and for withdrawing the air back through the rotatable body and out through the mouth and discharge-pipe, substantially as set forth.

In testimony whereof I have signed my name to this specification in the presence of two subscribing witnesses.

LUCIUS AXTELL.

Witnesses:
WILLIAM J. SHAKELTON,
NORA J. FLOWER.